US008279843B2

(12) United States Patent
Wengrovitz

(10) Patent No.: US 8,279,843 B2
(45) Date of Patent: Oct. 2, 2012

(54) APPLICATION-ENABLEMENT DATA SWITCH FOR ENHANCING LEGACY NFC SERVICES WITH WEB SERVICES

(75) Inventor: Michael S. Wengrovitz, Concord, MA (US)

(73) Assignee: Alcatel Lucent, Paris (FR)

( * ) Notice: Subject to any disclaimer, the term of this patent is extended or adjusted under 35 U.S.C. 154(b) by 432 days.

(21) Appl. No.: 12/651,901

(22) Filed: Jan. 4, 2010

(65) Prior Publication Data

US 2011/0164509 A1 Jul. 7, 2011

(51) Int. Cl.
*H04W 4/00* (2009.01)

(52) U.S. Cl. ........................................................ 370/338

(58) Field of Classification Search .......... 370/328–339, 370/351–356, 395.5–395.52, 400–401; 455/556.1–557; 340/572.1
See application file for complete search history.

(56) References Cited

U.S. PATENT DOCUMENTS

| | | | | |
|---|---|---|---|---|
| 7,296,740 | B2 * | 11/2007 | Agrawal et al. | 235/435 |
| 2007/0266310 | A1 | 11/2007 | Sasaki et al. | |
| 2008/0090595 | A1 * | 4/2008 | Liu et al. | 455/461 |

FOREIGN PATENT DOCUMENTS

| | | | |
|---|---|---|---|
| WO | 2006068338 | A1 | 6/2006 |
| WO | 2008090307 | A2 | 7/2008 |

OTHER PUBLICATIONS

Jamardo et al, Touch Computing: Simplifying Human to Environment Interaction through NFC Technology, 12 pages, 2007.*
Chavira et al, Combining RFID and NFC Technologies in an Aml Conference Scenario, IEEE, 8 pages, 2006.*
Sandner et al, All-I-Touch as Combination of NFC and Lifestyle, IEEE, 5 pages, 2009.*
Koskela et al, A Framework for Integration of Radio Frequency Identification and Rich Internet Applications, IEEE, 5 pages, 2007.*
International Search Report and Written Opinion: PCT/US2010/060172 dated Mar. 1, 2011 (9 pages).

* cited by examiner

*Primary Examiner* — Frank Duong
(74) *Attorney, Agent, or Firm* — Garlick & Markison; Holly L. Rudnick

(57) ABSTRACT

An Application-Enablement data switch enables web-enhanced services to be provided to legacy near-field communication (NFC) systems. The data switch receives IP packets from a legacy network and identifies select IP packets that contain NFC data indicating a reader ID of an NFC reader and a tag ID of an NFC tag in communication with the NFC reader. The switch further extracts the NFC data from the select IP packets and inserts the NFC data into a request message that is transmitted to a web application server that provides the web-enhanced services based on the NFC data.

20 Claims, 4 Drawing Sheets

APPLICATION-ENABLEMENT DATA SWITCH FOR ENHANCING LEGACY NFC SERVICES WITH WEB SERVICES

BACKGROUND OF THE INVENTION

1. Technical Field of the Invention

The present invention relates in general to communication systems and in particular, to near-field communication systems.

2. Description of Related Art

Near-Field Communication (NFC) systems have become an important new applications area for enterprises and service providers. In a typical NFC system, a user brings an NFC-enabled badge, such as an employee ID badge or a student ID card, in close contact with an NFC reader, and the identity of the NFC tag and NFC reader are passed along via an IP network to a server that provides user-dependent and reader-dependent services. For example, when a university student touches his/her NFC badge to a reader, a door to a dormitory may be opened. Data on the NFC badge may also be linked to the student's identification to trigger payments for purchases. For example, a student may use his/her NFC badge to pay for a meal in the cafeteria or to purchase books in the campus bookstore.

Recently, there has been an interest in delivering additional services on top of the traditional access control services provided by existing (legacy) NFC systems. For example, when a student gains access to campus facility using his/her NFC badge, the student may desire to have his/her location presence on Facebook or Netlog automatically updated. As another example, an enterprise employee may want to touch his/her NFC badge to an NFC reader associated with a PBX phone, and have the profile for the PBX phone automatically customized for this employee.

Unfortunately, legacy NFC badge/reader systems typically use private, non-standard IP-based communication protocols that make it extremely cumbersome or impossible for creative Web 2.0 developers to innovate and to add their services on top of existing infrastructure. For example, existing solution approaches include forming business relationships with all of the various access control system manufacturers, requesting that their server-based solutions expose Web 2.0 Application Program Interfaces (APIs), and updating their access control software in many existing legacy installations. As can be appreciated, this process is cumbersome, expensive, and largely impractical. Therefore, what is needed is a mechanism for "opening-up" the legacy, closed, proprietary NFC systems to new Web 2.0 services, without impacting, disrupting or otherwise disturbing the functionality already present in such systems.

SUMMARY OF THE INVENTION

A switch, in one embodiment of the present invention, within a legacy near field communication (NFC) system enables web services to be provided to the NFC system. The switch includes a first data port coupled to a network of the NFC system to receive IP packets and a processor coupled to the first data port to identify select ones of the IP packets transmitted from an NFC reader coupled to the network. The select IP packets contain NFC data indicating a reader identity (ID) of the NFC reader and a tag ID of an NFC tag in communication with the NFC reader, in which the tag ID uniquely identifies a user of the NFC system. The processor further extracts the NFC data from the select IP packets, generates a request message and inserts the extracted NFC data into the request message. The switch further includes a second data port for transmitting the request message to a web application server that provides the web services based on the NFC data.

In one embodiment, the processor sniffs the IP packets and recognizes a private protocol of the NFC reader to identify the select IP packets containing the NFC data. In another embodiment, the processor recognizes a protocol of an IP-izer coupled to the NFC reader that transmits the select IP packets containing the NFC data to the switch.

In an exemplary embodiment, the request message is one of a Hypertext Transfer Protocol (HTTP) request message or a Simple Object Access Protocol (SOAP)/Extensible Markup Language (XML) request message.

In a further embodiment, the switch includes switch fabric for routing the IP packets to an ID server coupled to the network. In still a further embodiment, the switch includes a data switch having the first data port and the second data port and a mirrored port for receiving the IP packets mirrored from the first data port and a computing device having the processor and coupled to the mirrored port to receive the IP packets.

A method, in another embodiment of the invention, provides web services in a legacy near field communication (NFC) system. The method includes receiving IP packets from a network and analyzing the IP packets to identify select ones of the IP packets transmitted from an NFC reader coupled to the network, in which the select IP packets contain NFC data indicating a reader ID of the NFC reader and a tag ID of an NFC tag in communication with the NFC reader, and the tag ID uniquely identifies a user of the NFC system. The method further includes extracting the NFC data from the select IP packets, generating a request message, inserting the extracted NFC data into the request message and transmitting the request message to a web application server that provides the web services to the NFC system based on the NFC data.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, an Application-Enablement Data Switch (AEDS) is added to a legacy near field communication (NFC) system. The AEDS opens-up the private NFC reader protocol without impacting the flow of data to the existing legacy NFC system. Although there may be thousands of NFC access control providers, there are currently only a few NFC reader vendors. For example, HIDGlobal™ is the global leader in NFC readers and provides NFC readers to many NFC access control providers. Therefore, by opening-up the private protocol of the NFC reader vendors, the majority of legacy NFC access control systems can be enhanced with web services.

Figure 1:
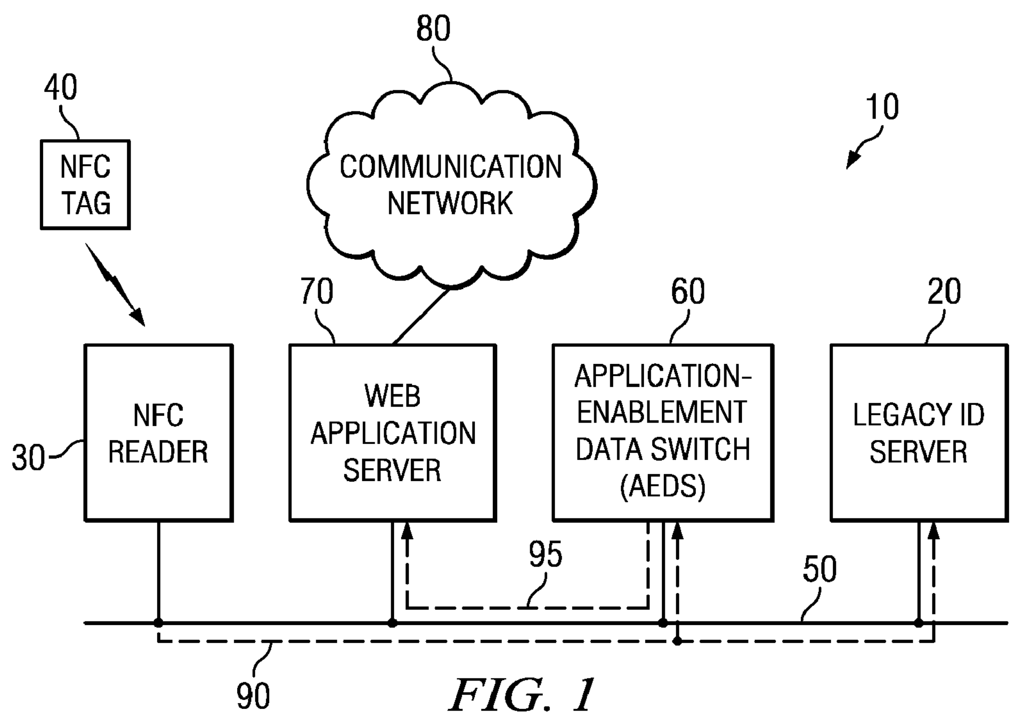
FIG. 1 illustrates an exemplary web-enhanced legacy near field communication (NFC) system, in accordance with embodiments of the present invention.

FIG. 1 illustrates an exemplary web-enhanced legacy NFC system 10, in accordance with embodiments of the present invention. The system 10 includes a legacy identity (ID) server 20 that provides legacy access control, purchasing and other similar ID-based services. The system 10 further includes a near field communication (NFC) reader 30 coupled to the legacy ID server 20 via a legacy network 50. The legacy network may be, for example, a local area network (LAN) 50, such as an Internet Protocol (IP) network. The NFC reader 30 is operable to communicate with an NFC tag 40 when the NFC tag 40 comes into close proximity with the NFC reader 30.

As used herein, the term "NFC" refers to a short-range, high frequency wireless communication technology that enables the exchange of data between devices over about a small (e.g., 20 centimeter or less) distance. NFC communicates via magnetic field induction, where two loop antennas are located within each other's near field, effectively forming an air-core transformer, and typically operates within the 125 kHz frequency band and/or the 13.56 MHz frequency band.

An NFC tag stores identification data for use in identifying the authorized person, while an NFC reader operates as an interrogator to retrieve the identification data stored on the NFC tag. The NFC tag may be an active tag that includes an internal power source, such as a battery, and/or a passive tag that does not contain an internal power source, but instead is remotely powered by the NFC reader.

As described above, communication between the NFC reader and the NFC tag is enabled by radio frequency (RF) signals. In general, to access the identification data stored on an NFC tag, the NFC reader generates a modulated RF interrogation signal designed to evoke a modulated RF response from a tag. The RF response from the tag includes the coded identification data stored in the NFC tag. The NFC reader decodes the coded identification data to identify the person associated with the NFC tag. For passive tags, the NFC reader also generates an unmodulated, continuous wave (CW) signal to activate and power the tag during data transfer.

Referring again to FIG. 1, when the NFC tag 40 comes into close proximity with the NFC reader 30, the NFC reader 30 communicates with the NFC tag 40 to retrieve the identification data (i.e., tag ID) that identifies the user associated with the NFC tag 40. The NFC reader 30 then provides the tag ID, along with the reader ID of the NFC reader 30, to the legacy ID server 20 via the LAN 50. The legacy ID server 20 provides legacy ID services to the user, such as enabling the user to make a purchase or opening a door to enable the user to gain access to a facility. For point-of-sale terminals incorporating an NFC reader 30, the NFC reader 30 can further be programmed to provide a sale amount (cost of goods/services to be purchased by user) to the legacy ID server 20 as either part of the reader ID or as data in addition to the reader ID.

In accordance with embodiments of the present invention, to enhance the legacy NFC system with web services, the system 10 further includes the AEDS 60 and a web application server 70 coupled to the LAN 50. The AEDS 60 interfaces between the legacy NFC system 10 and the web application server 70 to enable the web application server 70 to provide Web 2.0 services (hereinafter referred to as "web services") to users of the NFC system 10. Examples of web services include location-based services, money management services, profile sharing services and other types of web-enhanced services. The web application server 70 may further be coupled to an additional communication network 80 to access data and external resources that may be necessary to provide the web services. The communication network 80 may include any combination of packet-switched and/or circuit-switched networks. For example, the communication network 80 may include, but is not limited to, one or more of an Internet Protocol (IP), Multiprotocol Label Switching (MPLS), Asynchronous Transfer Mode (ATM), Ethernet or PSTN.

The AEDS 60 operates to switch and route IP packets in the legacy network 50 in the same manner as any other node within the legacy network 50. For example, the AEDS 60 can maintain Address Resolution Protocol (ARP) tables that are used to switch IP packets between devices on the legacy network 50. For example, data from the NFC reader 30 can be switched from the AEDS 60 to the legacy ID server 20 with no impact or modification to the IP packets. As such, the AEDS 60 can be transparent to data flow in the legacy system 10.

In addition, the AEDS 60 further sniffs and monitors the IP packets 90 passing through to identify those IP packets that contain NFC data (i.e., tag ID and reader ID information) within the private NFC reader protocol. Once identified, the AEDS 60 reformats the NFC data and transmits the NFC data within a request message 95, such as a Hypertext Transfer Protocol (HTTP) or Simple Object Access Protocol (SOAP)/Extensible Markup Language (XML) Application Program Interface (API) message, to the web application server 70. For high-availability, multiple AEDS's 60 could be implemented within the legacy system 10. For example, in a 2-server primary/secondary access control system, each legacy ID server 20 could be connected to the legacy network 50 via its own AEDS 60.

In an exemplary operation, after the NFC tag 40 comes into close proximity with the NFC reader 30, the NFC reader 30 communicates with the NFC tag 40 to retrieve the identification data (i.e., tag ID) that identifies the user associated with the NFC tag 40. The NFC reader 30 then transmits IP packets 90 containing the tag ID, along with the reader ID of the NFC reader 30, to the legacy ID server 20 via the LAN 50. The IP packets 90 travel along the legacy network 50 and are received by the AEDS 60, which sniffs the IP packets and analyzes the IP packets to determine whether the IP packets correspond to the private protocol emitted by the NFC reader 30. If so, the AEDS 60 decodes the NFC data within the IP packets to extract the NFC data and reformats the NFC data for inclusion in, for example, a Web 2.0 Restful and/or SOAP/XML API request message 95 containing the tag ID and reader ID data. The AEDS 60 then transmits the API request message 95 on a data port that is destined for the web application server 70. In addition, the AEDS further forwards the received IP packets 90 to the legacy ID server 20, which performs traditional legacy services, as described above, such as access control and purchasing.

Figure 2:
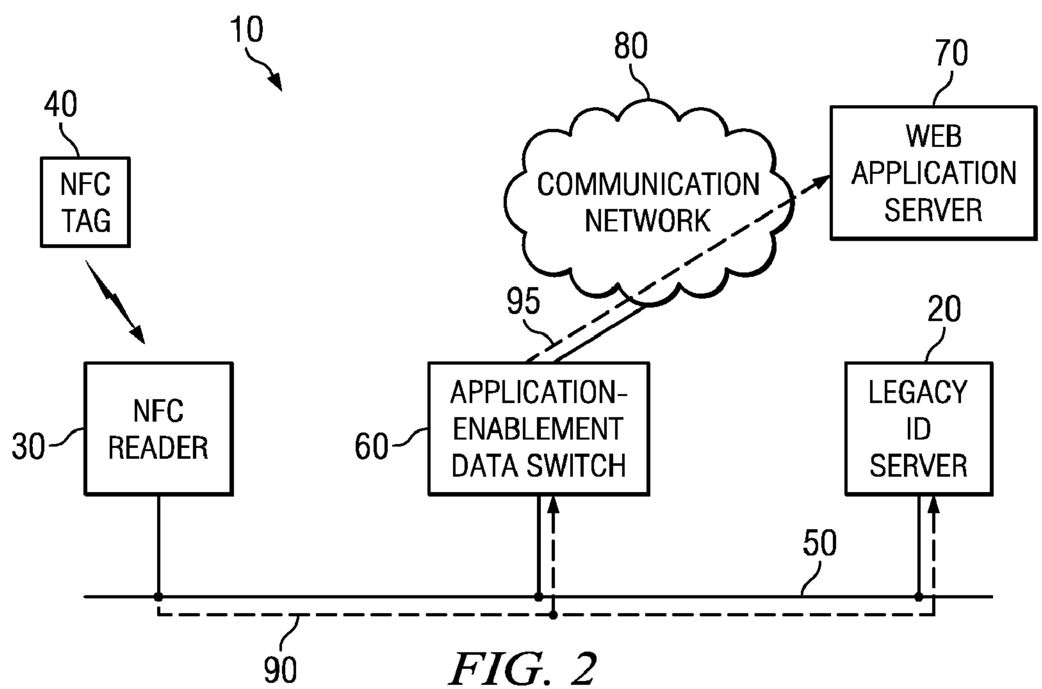
FIG. 2 illustrates another exemplary web-enhanced legacy NFC system, in accordance with embodiments of the present invention.

FIG. 2 illustrates another exemplary web-enhanced legacy NFC system 10, in accordance with embodiments of the present invention. In FIG. 2, the web application sever 70 is remote from the legacy network 50 and is coupled to the AEDS 60 via an external communication network 80.

Thus, in an exemplary operation, the AEDS 60 still operates to sniff IP packets from the legacy network 50 to identify those IP packets that contain NFC data and to reformat the NFC data for inclusion in an API request message. However, instead of transmitting the API request message 95 on a data port coupled to the legacy network 50, the AEDS 60 transmits the API request message to the web application server via the external communication network 80.

Figure 3:
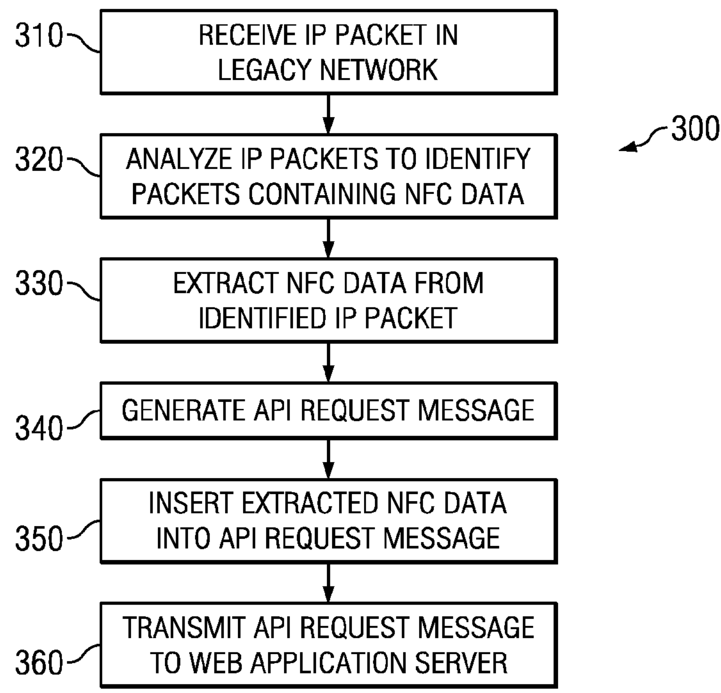
FIG. 3 is a flowchart illustrating an exemplary process for providing web services in a legacy NFC system.

FIG. 3 is a flowchart illustrating an exemplary process 300 for providing web services in a legacy NFC system. The process begins at 310, where IP packets are received by the AEDS from the legacy network. Then, at 320, the IP packets are analyzed to identify those IP packets that were transmitted from an NFC reader and contain NFC data (i.e., a reader ID of the NFC reader and a tag ID of an NFC tag in communication with the NFC reader). Once the IP packets containing NFC data are identified, at 330, the NFC data is extracted from the select IP packets, and at 340 and 350, the extracted NFC data is inserted into a request message generated for a web application server. Thereafter, at 360, the request message containing the NFC data is transmitted to the web application server, which in turn, provides web services to the legacy NFC system based on the NFC data.

Figure 4:
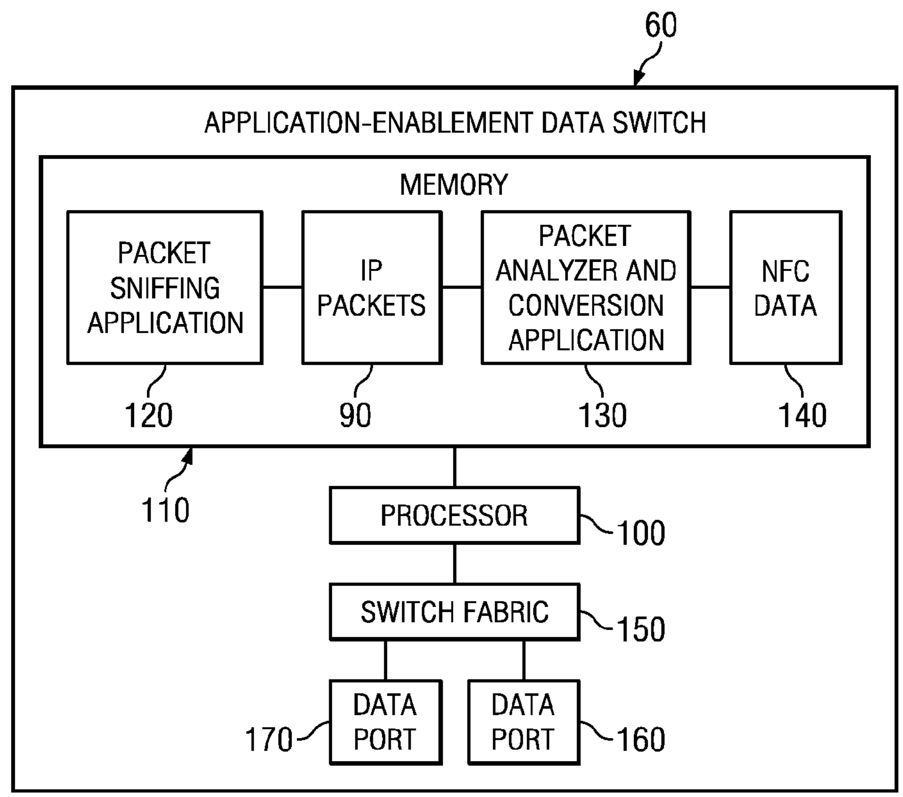
FIG. 4 is a block diagram of exemplary data switch for use within the web-enhanced legacy NFC system, in accordance with embodiments of the present invention.

FIG. 4 is a block diagram of exemplary AEDS 60 for use within the web-enhanced legacy NFC system, in accordance with embodiments of the present invention. The AEDS 60 includes a processor 100, memory 110, switch fabric 150 and data ports 160 and 170. Switch fabric 150 includes any combination of hardware and/or software that is capable of moving IP packets coming into the AEDS 60 out by the correct port to the next node in the legacy network. For example, switch fabric 150 can include the switching units, the integrated circuits that they contain, and the programming that allows switching paths to be controlled. Data port 160 is coupled to the legacy network to receive IP packets from the legacy network. Data port 160 may include a single port or multiple ports. Data port 170 is coupled to either the legacy network or an external network to transmit the API request message to the web application server.

The memory 110 maintains a packet sniffing application 120 and a packet analyzer and conversion application 130 and the processor 100 is coupled to the memory 110 to execute instructions of the packet sniffing application 120 and the packet analyzer and conversion application 130. The packet sniffing application 120 can be, for example, a tcpdump packet tracing application that sniffs IP packets on data port 160 and outputs sniffed IP packets 90 to the packet analyzer and conversion application 130.

The packet analyzer and conversion application 130 analyzes the real-time tcpdump, or filtered tcpdump, output and determines which of the sniffed packets corresponds to a private protocol emitted by NFC readers. Thus, the packet analyzer and conversion application 130 is programmed to recognize one or more of the private protocols of NFC readers and to process IP packets formatted in accordance with one of the NFC reader protocols. For example, the packet analyzer and conversion application 130 can decode the NFC data 140 included within the identified IP packets and reformat the NFC data 140 for inclusion within an API request message, such as a Web 2.0 Restful and SOAP/XML API request. The processor 100 can then instruct the switch fabric 150 to emit the API request on the data port 170 destined for the web application server.

In addition, the switch fabric 150 can further switch the IP packets received on data port 160 to the appropriate destination device on the legacy network. For example, the switch fabric 150 can route IP packets received from the NFC reader and destined for the legacy ID server to the legacy ID server via the legacy network. This switching can be performed transparently to the legacy network, i.e., with no TCP/IP anchoring, no socket connections, etc.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

Figure 5:
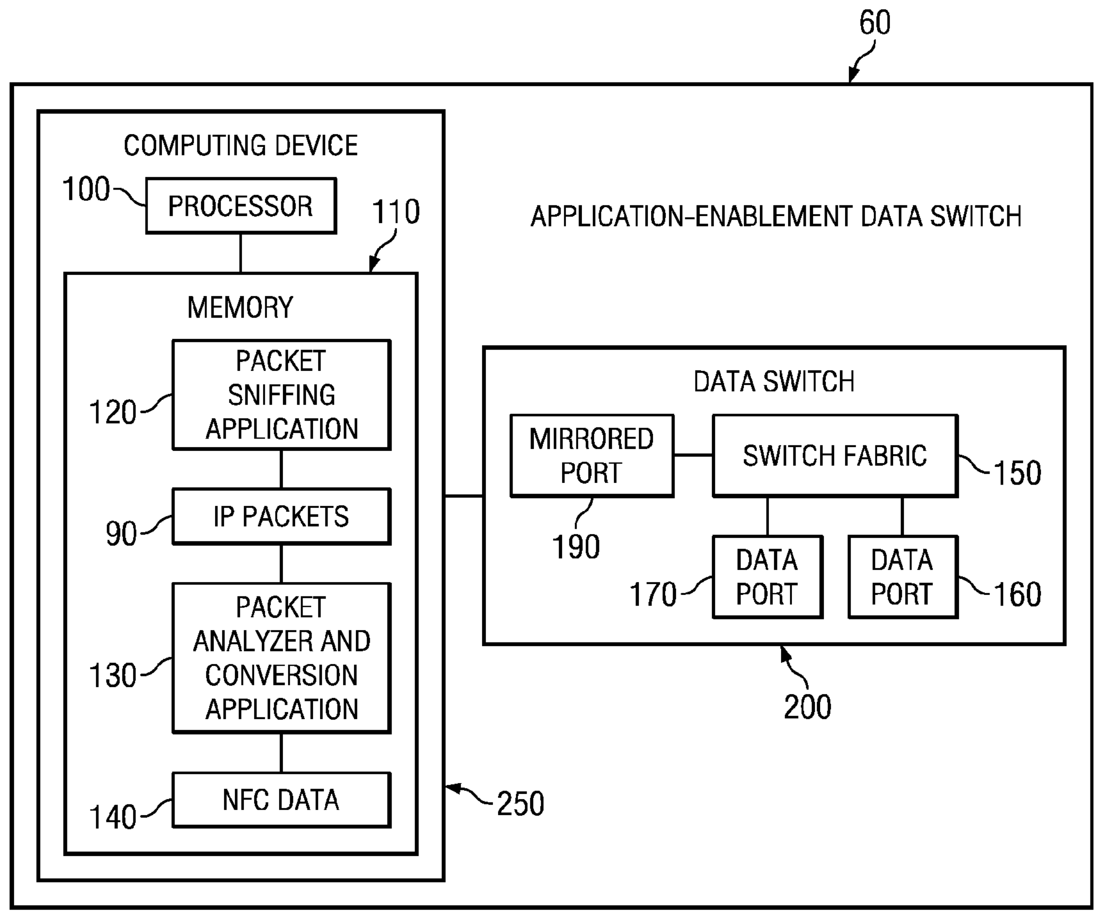
FIG. 5 is a block diagram of another exemplary data switch for use within the web-enhanced legacy NFC system, in accordance with embodiments of the present invention.

FIG. 5 is a block diagram of another exemplary AEDS 60 for use within the web-enhanced legacy NFC system, in accordance with embodiments of the present invention. In FIG. 5, customized hardware is not required and the AEDS 60 is implemented using a standard data switch 200 with port mirroring coupled to an external computing device 250, such as a PC server, running the packet sniffing and packet analyzer applications 120 and 130. In this embodiment, IP packets transmitted from the NFC readers are received at data port 160 and mirrored to mirrored port 190. The computing device 250 is connected to the mirrored port 190 and includes the processor 110 that executes the IP packet sniffing application 120, such as tcpdump, and pipes the output (IP packets 90) into the packet analyzer and conversion application 130, which then analyzes the real-time tcpdump, or filtered tcpdump, output. When the packet analyzer application 130 detects, for example, a tag read event within a private protocol IP packet 90, the packet analyzer application 130 analyzes and decodes this IP packet 90 to extract the tag ID and reader ID (NFC data 140), and then inserts the tag ID and reader ID in a request message generated towards the web application server. The processor 100 then instructs the data switch 200 to transmit the request message to the web application server via switch fabric 150 and data port 170.

Figure 6:
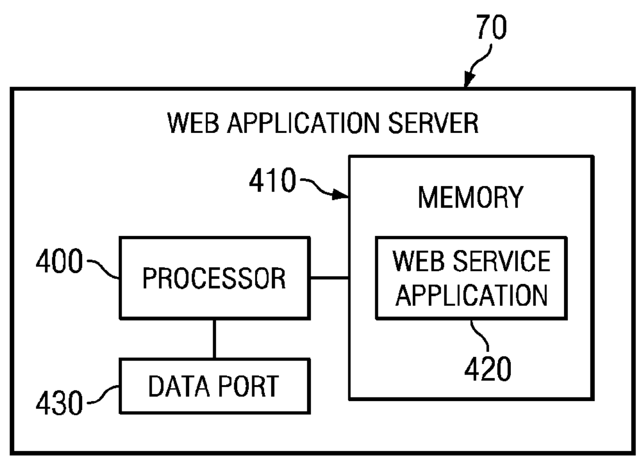
FIG. 6 is a block diagram of an exemplary web application server for use within the web-enhanced legacy NFC system, in accordance with embodiments of the present invention.

FIG. 6 is a block diagram of an exemplary web application server 70, in accordance with embodiments of the present invention. The web application server 70 includes a processor 400, memory 410 and data port 430. Data port 430 can include one or more ports, each coupled to a different network. For example, one data port could be coupled to the legacy network of the legacy NFC system, while another port could be coupled to an external communication network, such as the Internet.

The memory 410 maintains a web service application 420, and the processor 400 is further coupled to the memory 410 to execute instructions of the web service application 420. For example, the processor 400 can execute instructions of the web service application 420 to receive a tag ID and reader ID associated with a respective NFC tag and NFC reader from the AEDS via data port 430. The processor 400 can further execute instructions of the web service application 420 to determine a particular web service to be provided to the legacy NFC system and/or one or more users of the legacy NFC system based on the tag ID and the reader ID. For example, the web service can include a location-based service, money management service, profile sharing service or other type of web-enhanced service.

Figure 7:
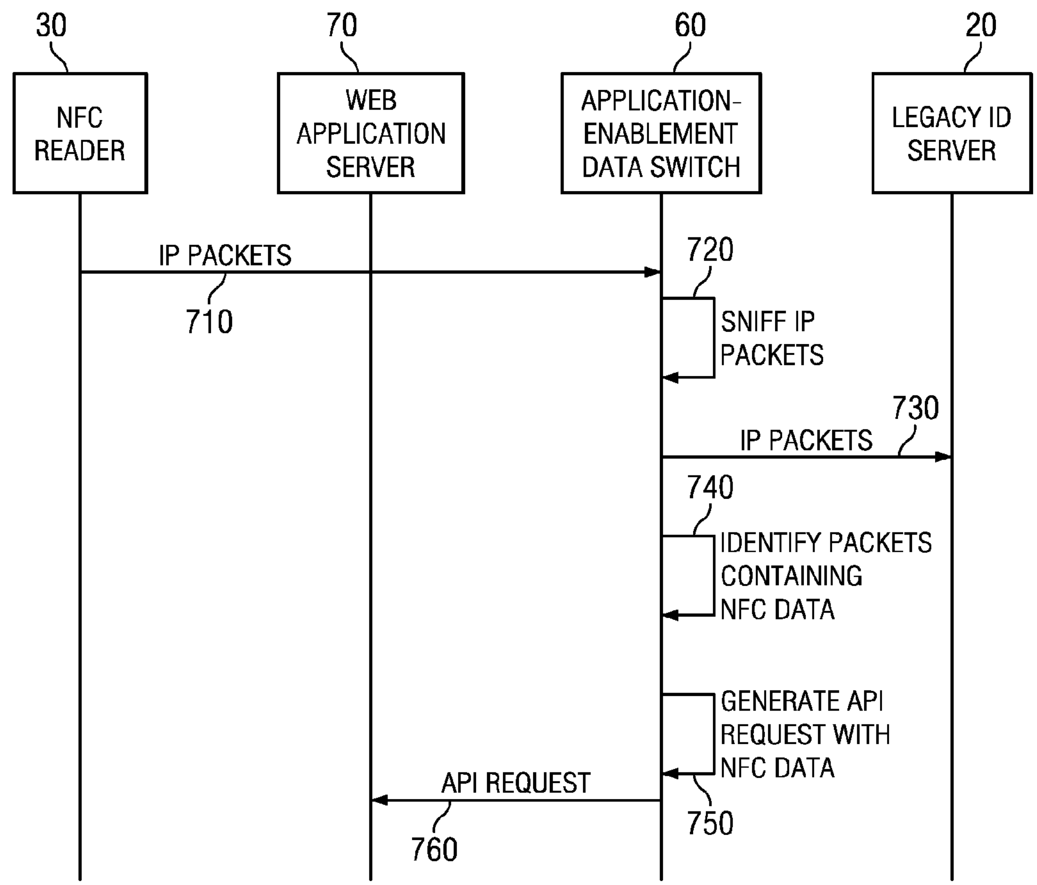
FIG. 7 illustrates an exemplary mechanism for integrating web services within a legacy NFC system, in accordance with embodiments of the present invention.

FIG. 7 illustrates an exemplary mechanism for integrating web services within a legacy NFC system, in accordance with embodiments of the present invention. In FIG. 7, at step 710, when the NFC tag provides the tag ID to the NFC reader 30, the NFC reader 30 transmits IP packets containing the tag ID and reader ID to the legacy ID server 20 via the legacy network, which is received at the AEDS 60. At step 720, the AEDS 60 sniffs the received IP packets to enable analysis of the sniffed IP packets, and at step 730, the AEDS 60 forwards the IP packets onto the legacy ID server via the legacy network.

Thereafter, at step 740, the AEDS 60 analyzes the sniffed IP packets to identify any IP packets that contain NFC data and extracts the NFC data. At 750, the AEDS 60 generates an API request message with the extracted NFC data, and at step 760, transmits the API request message to the web application server 70 for use in providing web services to the legacy NFC system.

Figure 8:
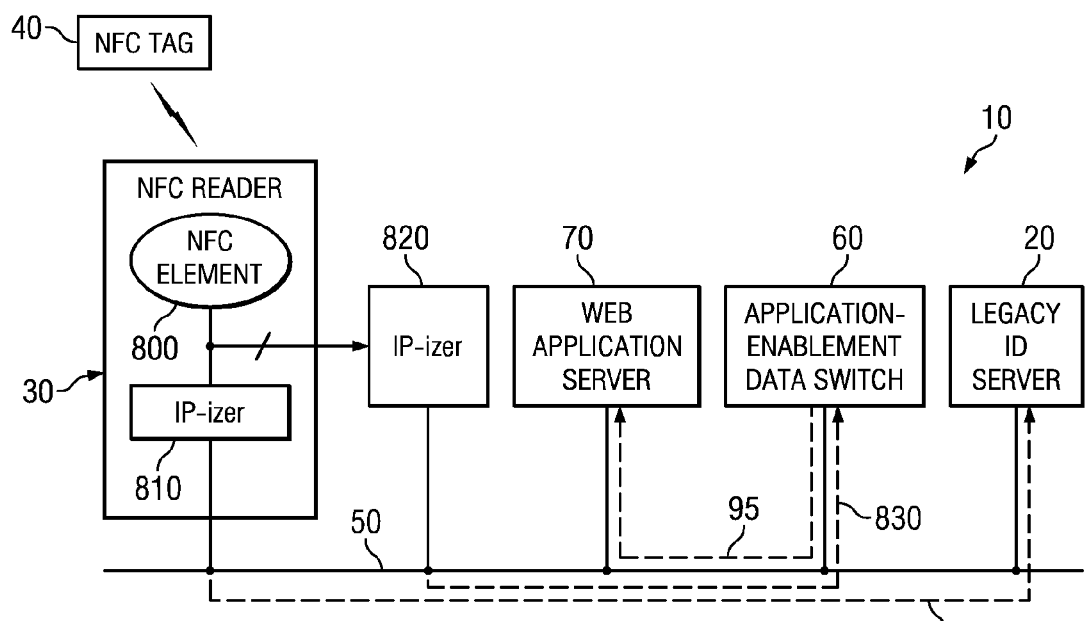
FIG. 8 illustrates yet another exemplary web-enhanced legacy NFC system, in accordance with embodiments of the present invention.

FIG. 8 illustrates yet another exemplary web-enhanced legacy NFC system, in accordance with embodiments of the present invention. In FIG. 8, instead of the AEDS 60 being programmed to recognize and process IP packets within the private protocol of the NFC reader 30, the NFC reader's serial data is split to enable the NFC data to be transmitted to the AEDS 60 using a standard protocol. This mechanism exploits the fact that in most access control installations, the IP-based NFC reader 30 is actually formed of two pieces: the NFC reader element 800 that communicates over a serial cable via serial clock/data or Weigand protocols, and another element (IP-Izer 810) that converts the serial data to IP protocol, or "IP-izes" this serial data for transmission to the legacy student ID server 20 via the legacy network 50.

In this integration mechanism, the serial data between the NFC reader element 800 and the IP-izer 810 is split, and is sent in parallel to a second IP-izer element 820 (having a known IP protocol as its output), which in turn then forwards its IP data (tag ID and reader ID) to the AEDS 60. By utilizing a separate IP-izer 820 for the AEDS 60, the AEDS 60 does not need to decode any private protocol to/from the legacy ID system, which may be unknown or encrypted.

In an exemplary operation, after the NFC tag 40 comes into close proximity with the NFC reader 30, the NFC reader element 800 communicates with the NFC tag 40 to retrieve the identification data (i.e., tag ID) that identifies the user associated with the NFC tag 40. The NFC reader element 800 then transmits NFC data containing the tag ID and reader ID along two paths: one towards IP-izer 810 and another towards IP-izer 820. IP-izer 810 formats the NFC data according to the private protocol of the NFC reader 30, and transmits IP packets 90 containing the tag ID, along with the reader ID of the NFC reader 30, to the legacy ID server 20 via the legacy network 50. IP-izer 820 formats the NFC data according to the standard protocol understood by the AEDS 60, and transmits IP packets 830 containing the tag ID, along with the reader ID of the NFC reader 30, to the AEDS 60 via the legacy network 50. The AEDS 60 then decodes the NFC data within the received IP packets 830 to extract the NFC data and reformats the NFC data for inclusion in, for example, a Web 2.0 Restful and/or SOAP/XML API request 95 containing the tag ID and reader ID data. The AEDS 60 then transmits the API request 95 on a data port coupled to the legacy network 50 that is destined for the web application server 70.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

The invention claimed is:

1. A switch for use in a near field communication (NFC) system that enables web services to be provided to the NFC system, the switch comprising:

a first data port coupled to a network of the NFC system to receive IP packets;

a processor coupled to the first data port to identify select ones of the IP packets transmitted from an NFC reader coupled to the network, the select IP packets containing NFC data indicating a reader identity (ID) of the NFC reader and a tag ID of an NFC tag in communication with the NFC reader, the tag ID uniquely identifying a user of the NFC system, the processor being operable to extract the NFC data from the select IP packets, generate a request message and insert the extracted NFC data into the request message; and a second data port coupled to the processor to receive the request message and operable to transmit the request message to a web application server that provides the web services based on the NFC data.

2. The switch of claim 1, wherein the second data port is coupled to the network to transmit the request message to the web application server.

3. The switch of claim 1, wherein the second data port is an external data port coupled to an additional network to transmit the request message to the web application server.

4. The switch of claim 1, further comprising:

a data switch including the first data port and the second data port and further including a mirrored port for receiving the IP packets mirrored from the first data port; and a computing device including the processor and coupled to the mirrored port to receive the IP packets.

5. The switch of claim 1, wherein the processor is operable to sniff the IP packets and to recognize a private protocol of the NFC reader to identify the select IP packets containing the NFC data.

6. The switch of claim 1, wherein the processor is operable to recognize a protocol of an IP-izer coupled to the NFC reader that transmits the select IP packets containing the NFC data to the switch.

7. The switch of claim 1, wherein the processor is operable to decode the select IP packets to extract the NFC data.

8. The switch of claim 1, wherein the request message is one of a Hypertext Transfer Protocol (HTTP) request message or a Simple Object Access Protocol (SOAP)/Extensible Markup Language (XML) request message.

9. The switch of claim 1, further comprising:

switch fabric coupled to the processor, the first data port and the second data port, the switch fabric operable to route the IP packets to an ID server coupled to the network.

10. The switch of claim 1, further comprising:

a memory including a packet sniffing application executable by the processor to sniff the IP packets and a packet analyzer and conversion application executable by the processor to detect the NFC data.

11. A method for providing web services in a near field communication (NFC) system, the method comprising:

receiving IP packets from a network;

analyzing the IP packets to identify select ones of the IP packets transmitted from an NFC reader coupled to the network, the select IP packets containing NFC data indicating a reader ID of the NFC reader and a tag ID of an NFC tag in communication with the NFC reader, the tag ID uniquely identifying a user of the NFC system;

extracting the NFC data from the select IP packets;

generating a request message;

inserting the extracted NFC data into the request message; and transmitting the request message to a web application server that provides the web services to the NFC system based on the NFC data.

12. The method of claim 11, wherein the transmitting further includes:

transmitting the request message to the web application server via the network.

13. The method of claim 11, wherein the transmitting further includes:

transmitting the request message to the web application server via an additional network.

14. The method of claim 11, further comprising:

mirroring the IP packets received at a first data port coupled to the network to a mirrored port coupled to a computing device to perform at least the analyzing of the IP packets.

15. The method of claim 11, wherein the analyzing further comprises:

sniffing the IP packets received from the network to produce an output of sniffed IP packets; and analyzing the sniffed IP packets to identify the select IP packets.

16. The method of claim 11, wherein the analyzing further comprises:

recognizing a private protocol of the NFC reader to identify the select IP packets containing the NFC data.

17. The method of claim 11, wherein the analyzing further comprises:

recognizing a protocol of an IP-izer coupled to the NFC reader that transmits the select IP packets containing the NFC data to identify the select IP packets.

18. The method of claim 11, wherein the extracting further comprises:

decoding the select IP packets to extract the NFC data.

19. The method of claim 11, wherein the generating further comprises:

generating the request message as one of a Hypertext Transfer Protocol (HTTP) request message or a Simple Object Access Protocol (SOAP)/Extensible Markup Language (XML) request message.

20. The method of claim 11, further comprising:

routing the IP packets to an ID server coupled to the network.

* * * * *